US010762289B2

(12) United States Patent
Dickerman et al.

(10) Patent No.: US 10,762,289 B2
(45) Date of Patent: *Sep. 1, 2020

(54) DATA ANALYSIS EXPRESSIONS

(71) Applicant: MICROSOFT TECHNOLOGY LICENSING, LLC, Redmond, WA (US)

(72) Inventors: Howard J. Dickerman, Bellevue, WA (US); Marius Dumitru, Sammamish, WA (US); Akshai Mirchandani, Redmond, WA (US); Yutong (Jeffrey) Wang, Bellevue, WA (US); Amir Netz, Bellevue, WA (US); Paul J. Sanders, Mercer Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/592,991

(22) Filed: May 11, 2017

(65) Prior Publication Data
US 2018/0032498 A1 Feb. 1, 2018

Related U.S. Application Data

(63) Continuation of application No. 14/997,138, filed on Jan. 15, 2016, now Pat. No. 9,665,555, which is a continuation of application No. 12/576,254, filed on Oct. 9, 2009, now Pat. No. 9,275,031.

(51) Int. Cl.
G06F 17/00 (2019.01)
G06F 40/18 (2020.01)

(52) U.S. Cl.
CPC ................... G06F 40/18 (2020.01)

(58) Field of Classification Search
None
See application file for complete search history.

(56) References Cited

U.S. PATENT DOCUMENTS

| 5,603,021 | A | 2/1997 | Spencer et al. |
| 5,708,827 | A | 1/1998 | Kaneko et al. |
| 5,870,747 | A | 2/1999 | Sundaresan et al. |
| 6,292,811 | B1 | 9/2001 | Clancey et al. |
| 7,299,223 | B2 | 11/2007 | Namait et al. |
| 7,337,176 | B1 | 2/2008 | Cheedella et al. |
| 7,415,481 | B2 | 8/2008 | Becker et al. |
| 7,882,132 | B2 | 2/2011 | Ghatare |

(Continued)

FOREIGN PATENT DOCUMENTS

| CN | 1755668 A | 4/2006 |
| CN | 1755679 A | 4/2006 |

(Continued)

OTHER PUBLICATIONS

"Supplementary Search Report Issued European Patent Application No. 10822640.8", dated Dec. 19, 2017, 10 Pages.

(Continued)

*Primary Examiner* — Mustafa A Amin
(74) *Attorney, Agent, or Firm* — Shook, Hardy & Bacon LLC

(57) ABSTRACT

Methods and systems are disclosed for receiving and processing data analysis expressions. A particular method includes receiving a data analysis expression at a pivot table of a spreadsheet. The data analysis expression is executed for a particular cell of the pivot table by determining a context associated with the particular cell, calculating a value of the data analysis expression based on the context, and outputting the calculated value at the particular cell.

20 Claims, 10 Drawing Sheets

(56) References Cited

U.S. PATENT DOCUMENTS

| | | | |
|---|---|---|---|
| 7,991,804 | B2 | 8/2011 | Battagin et al. |
| 8,112,701 | B2 | 2/2012 | Gur et al. |
| 2001/0056440 | A1 | 12/2001 | Abramson et al. |
| 2002/0055952 | A1 | 5/2002 | Clancey et al. |
| 2002/0184260 | A1 | 12/2002 | Martin et al. |
| 2003/0009649 | A1 | 1/2003 | Martin et al. |
| 2004/0237029 | A1 | 11/2004 | Medicke et al. |
| 2005/0055329 | A1 | 3/2005 | Bakalash et al. |
| 2006/0015805 | A1 | 1/2006 | Humenansky et al. |
| 2006/0026122 | A1 | 2/2006 | Hurwood et al. |
| 2006/0036939 | A1 | 2/2006 | Hobbs et al. |
| 2006/0069696 | A1 | 3/2006 | Becker et al. |
| 2006/0075328 | A1 | 4/2006 | Becker et al. |
| 2006/0085386 | A1 | 4/2006 | Thanu et al. |
| 2006/0129932 | A1 | 6/2006 | Weber et al. |
| 2006/0235834 | A1 | 10/2006 | Blakeley et al. |
| 2006/0271841 | A1 | 11/2006 | Thanu et al. |
| 2007/0016849 | A1 | 1/2007 | Aureglia et al. |
| 2007/0055922 | A1 | 3/2007 | Martynov et al. |
| 2007/0061344 | A1 | 3/2007 | Dickerman et al. |
| 2007/0088691 | A1 | 4/2007 | Dickerman et al. |
| 2007/0220416 | A1 | 9/2007 | Mitsui |
| 2008/0028288 | A1 | 1/2008 | Vayssiere et al. |
| 2008/0126333 | A1 | 5/2008 | Bezar et al. |
| 2008/0294612 | A1 | 11/2008 | Wiles |
| 2009/0006301 | A1 | 1/2009 | Goetsch et al. |
| 2009/0019350 | A1 | 1/2009 | Wei et al. |
| 2009/0044091 | A1 | 2/2009 | Gur et al. |
| 2009/0144313 | A1 | 6/2009 | Hodge et al. |
| 2009/0158251 | A1 | 6/2009 | Angrish et al. |
| 2009/0327851 | A1 | 12/2009 | Raposo |
| 2010/0083090 | A1 | 4/2010 | Coblenz et al. |
| 2010/0153295 | A1 | 6/2010 | Cleaveland et al. |
| 2010/0169759 | A1 | 7/2010 | Le Brazidec et al. |

FOREIGN PATENT DOCUMENTS

| | | |
|---|---|---|
| JP | 2006107441 A | 4/2006 |
| JP | 2006107444 A | 4/2006 |

OTHER PUBLICATIONS

"Pivot Tables in Excel 2007", Retrieved from <<http://www.mu.edu/~owt/excel/excelPivot.pdf>>, Dec. 28, 2007, 4 Pages.

Oppenheimer, Diego, "Common Questions Around Excel 2007 OLAP Pivot Tables", Retrieved from <<https://blogs.office.com/en-us/2008/02/06/common-questions-around-excel-2007-olap-pivottables/>>, Feb. 6, 2008, 8 pages.

"Pivot Table Tutorial—Multiple Consolidation Ranges", Retrieved from <<https://web.archive.org/web/20090925145711/http://www.contextures.com/xlPivot08.html >>, Sep. 25, 2009, 4 Pages.

Shin, et al., "An Efficient Sheet Partition Technique for Very Large Relational Tables in OLAP", In Proceedings of the Lecture Notes in Computer Science, vol. 4587, Jul. 3, 2007, 14 Pages.

"First Office Action and Search Report Issued in Chinese Patent Application No. 201510616470.5", dated Aug. 1, 2017, 12 Pages.

"Office Action Issued in Japanese Patent Application No. 2012-533292", dated Feb. 29, 2016, 13 Pages.

"Notice of Allowance Issued in Japanese Patent Application No. 2012-533292", dated Aug. 30, 2016, 3 Pages.

"Office Action Issued in Chinese Patent Application No. 201080045506.4", dated Jun. 24, 2015, 14 Pages.

"Second Office Action Issued in Chinese Patent Application No. 201080045506.4", dated Dec. 2, 2013, 9 Pages.

"Office Action Issued in Japanese Patent Application No. 2012-533292", dated May 20, 2014, 6 Pages.

"Office Action Issued in Chinese Patent Application No. 201080045506.4", dated Jan. 23, 2015, 9 Pages.

"Office Action Issued in Japanese Patent Application No. 2012-533292", dated Mar. 2, 2015, 5 Pages.

"Office Action Issued in Chinese Patent Application No. 201080045506.4", dated Apr. 21, 2014, 8 Pages.

"International Search Report and Written Opinion Issued in PCT Application No. PCT/US2010/051696", dated Jun. 3, 2011, 8 Pages.

"Office Action Issued in Chinese Patent Application No. 201080045506.4", dated Apr. 23, 2013, 11 Pages.

Das, Rajdip, "Microsoft Dynamics AC Previously known as Axapta", retrieved at http://dynamicsaxworld.blogspot.com/, Jul. 10, 2009, pp. 11.

"Functions & Data Analysis Tools", retrieved at http://www.techdocs.ku.edu/docs/excel_2000_Junctions.pdf, ACS Computer Training, pp. 1-18.

Pendse, Nigel, "Commentary: Project Gemini—Microsoft's Brilliant OLAP Trojan Horse", retrieved at http://www.olapreport.com/Comment_Gemini.htm, second annual Microsoft BI Conference, Feb. 14, 2003, University of Kansas, pp. 4.

"Rules for Creating Formulas", retrieved at http://www.kirix.com/help.docs/index.hmtl?rules_for_creating_formulas.htm pp. 2.

Excel 2007 Development, retrieved at http://msdn.microsfot.com/en-us/office/aa905419, Mar. 20, 2012, pp. 1-4.

Excel 2007—Training, retrieved at http://office.microsoft.com/en-us/training/CR010047968.aspx, Mar. 20, 2012, pp. 1-2.

Divot Table II: Filter PivotTable report data in Excel 2007, retrieved at http://office.microsoft.com/en-us/training/pivottable-ii-filter-pivottable-report-data-in-excel-2007-RZ010208048.aspx?CTT=1, Mar. 20, 2012, p. 1.

DivotTable III: Calculate data in PrivotTable reports in Excel 2007, retrieved at http://office.microsoft.com/en-us/excel-help/pivottable-iii-calculate-data-in-pivottable-reports-in-excel-2007-RZ010210288.aspx?CTT=1, p. 1.

Goto, Shimako, "SQL Server 7.0 is Finally Here," Back Office Magazime, Japan, CQ Publishing Co., Ltd., Mar. 1, 1999, vol. 3, No. 3, pp. 96-99.

Urushio, Takayoshi, "Greatly Improved Data Analysis Function; The Ability of Excel 2007 has been Further Improved as a Front End Tool," DB Magazine, Japan, Shoeisha, Co., Ltd., Mar. 1, 2007, vol. 16, No. 12, pp. 134-141.

Fields, Ellie, "Tableau 5.0 Preview", Apr. 6, 2009, 4 pages. Available at: http://www.tableau.com/blog/tableau-5-preview.

Unknown Author, "Tableau Version 5 New Features", 2009, 56 pages. Available at: http://mkt.tableau.com/files/Tableau-5.0-New-Features-3.pdf.

Cukier, Jerome, "Review of Tableau 5.0", Sep. 1, 2009, 21 pages. Available at: http://www.jeromecukier.net/blog/2009/09/01/review-of-tableau-50.

Unknown Author, "PivotTable I: Get Started with PivotTable Reports in Excel 2007", Published 2007, 2 pages. Available at: https://support.office.com/en-au/article/PivotTable-I-Get-started-with-PivotTable-reports-in-Excel-2007-bfe774d3-3e20-46f7-b6a347984855d665.

Author, "See Sales by Country", Published 2007, 2 pages. Available at: https://support.office.com/en-au/article/See-sales-by-country-9f541da0-3207-4271-bacd-9c4cf32d4c29.

Unknown Author, "Connect to (import) an OLAP database", Published 2007, 3 pages. Available at: https://support.office.com/en-au/article/Connect-to-import-an-OLAP-database-e26384cb-30be-4324-adee-066cd62b1ae9?CorrelationId=2a4f88cb-f214-44eb-b42c441815dbff57&ui=en-US&rs=en-AU&ad=AU.

Ecklund, Paula, A Beginning Guide to the Excel 2007 Pivot Table, Published 2008, 24 pages. Available at: https://faculty.fuqua.duke.edu/—pecklund/ExcelReview/An%20Introduction%20to%20the%202007%20Pivot%20Table.pdf.

Preview of Project Gemini (Microsoft) retrieved at http://www.olapreport.com/purchase/Reviews/gemini_preview.htm, 2008, p. 1.

Preview of Microsoft's Project Gemini, retrieved at http://www.olapreport.com/purchase/snapshot/gemini_preview.htm, 2008, pp. 3.

Kerr, Rob, "TechEd 2009: Microsoft BI—Gemini", retrieved at http://robkerr.com/post/2009/05/Microsoft-BI---Gemini.aspx, May 12, 2009, pp. 3.

(56) References Cited

OTHER PUBLICATIONS

Whitehouse, Alan, "PerformancePoint PEL Business Rule Creation Walk Through," retrieved at http://alanwhitehouse.wordpress.com/2008/04/23/performancepoint-pel-business-rule-creation-walk-through/, Apr. 23, 2008, pp. 7.

Buchita, Hilmar, "DAX vs. MDX: An Example", Retrieved from http://blog.oraylis.de/2013/03/dax-vs-mdx-an-example/, Mar. 2013, 7 Pages.

"Second Office Action Issued in Chinese Patent Application No. 201510616470.5", dated Apr. 23, 2018, 6 Pages.

SALES TABLE

| | Date | CustID | ProdID | Qty | Price | Amount | |
|---|---|---|---|---|---|---|---|
| | 320 | 330 | 340 | 350 | 360 | 370 | |
| 310 | 02/03/08 | Jon200 | 123Blue | 3 | $200.00 | $600.00 | =Qty*Price |
| | 03/01/08 | Doe100 | 456Red | 2 | $300.00 | $600.00 | |
| | 02/10/08 | Jon200 | 789Green | 4 | $250.00 | $1,000.00 | |
| | 02/15/09 | Bil300 | 123Blue | 3 | $200.00 | $600.00 | |
| | 01/05/09 | Doe100 | 456Red | 2 | $300.00 | $600.00 | |
| | 03/01/09 | Bil300 | 789Green | 4 | $250.00 | $1,000.00 | |
| | 02/03/08 | Bil300 | 123Blue | 1 | $200.00 | $200.00 | |
| | 03/01/08 | Doe100 | 456Red | 5 | $300.00 | $1,500.00 | |
| | 02/10/08 | Jon200 | 789Green | 2 | $250.00 | $500.00 | |
| | Total | | | | | $6,600.00 | 380 |

*FIG. 3*

DATA ANALYSIS EXPRESSIONS

CROSS-REFERENCE TO RELATED APPLICATIONS

This application is a continuation of continuation of U.S. patent application Ser. No. 14/997,138, filed Jan. 15, 2016, and titled "Data Analysis Expressions," which is a continuation of U.S. patent application Ser. No. 12/576,254, filed Oct. 9, 2009, and titled "Data Analysis Expressions," the entirety of both are hereby incorporated by reference.

BACKGROUND

Multi-dimensional data analysis (e.g., viewing and analyzing data from multiple perspectives) has become increasingly popular with businesses. However, current multi-dimensional data analysis applications typically require users to be proficient in complex semantic languages such as Multi-Dimensional Expression Language (MDX), because MDX expressions are used to organize and analyze the data. Thus, it may be difficult for business employees untrained in MDX to perform multi-dimensional data analysis. Furthermore, although business employees may be familiar with data analysis formulae provided by commonly available spreadsheet applications, such formulae are usually not as powerful as multi-dimensional data analysis programs. For example, such formulae may only enable a one-dimensional (e.g., sequential) aggregation of data. Therefore, a business that makes decisions based on multiple factors may be faced with a choice between two expensive alternatives: train existing employees in complex languages such as MDX or hire analysts that specialize in multi-dimensional data analysis.

SUMMARY

Systems and methods of receiving and processing data analysis expressions (DAXs) are disclosed. A DAX may be defined in an expression language similar to spreadsheet formulae and may operate on a spreadsheet table to perform multi-dimensional data analysis and data analysis with respect to relational data models. Thus, DAXs may empower people familiar with existing spreadsheet applications to perform multi-dimensional data analysis and data analysis with respect to relational data models (e.g., within existing spreadsheet applications). Unlike conventional spreadsheet formulae, a DAX beneficially is independent of particular cell ranges of the spreadsheet.

For example, a DAX may be received and executed at a pivot table of a spreadsheet application. Executing the DAX for a particular cell of the pivot table may include determining a context for the particular cell, calculating the value of the DAX for the particular cell, and outputting the calculated value of the DAX at the particular cell.

DAXs may support multi-table execution. For example, a DAX may refer to a first data table and a second data table, and executing the DAX may include traversing a relationship between the first data table and the second data table (e.g., following a relationship that may exist between a column in a first table and a column in a second table). DAXs may also support dynamic re-execution. For example, a DAX may be automatically re-executed with respect to a set of rows of a data table in response to a user modification to data stored in the set of rows.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 illustrates a particular embodiment of a data table useable by the system of FIG. 1;

DETAILED DESCRIPTION

Figure 1:
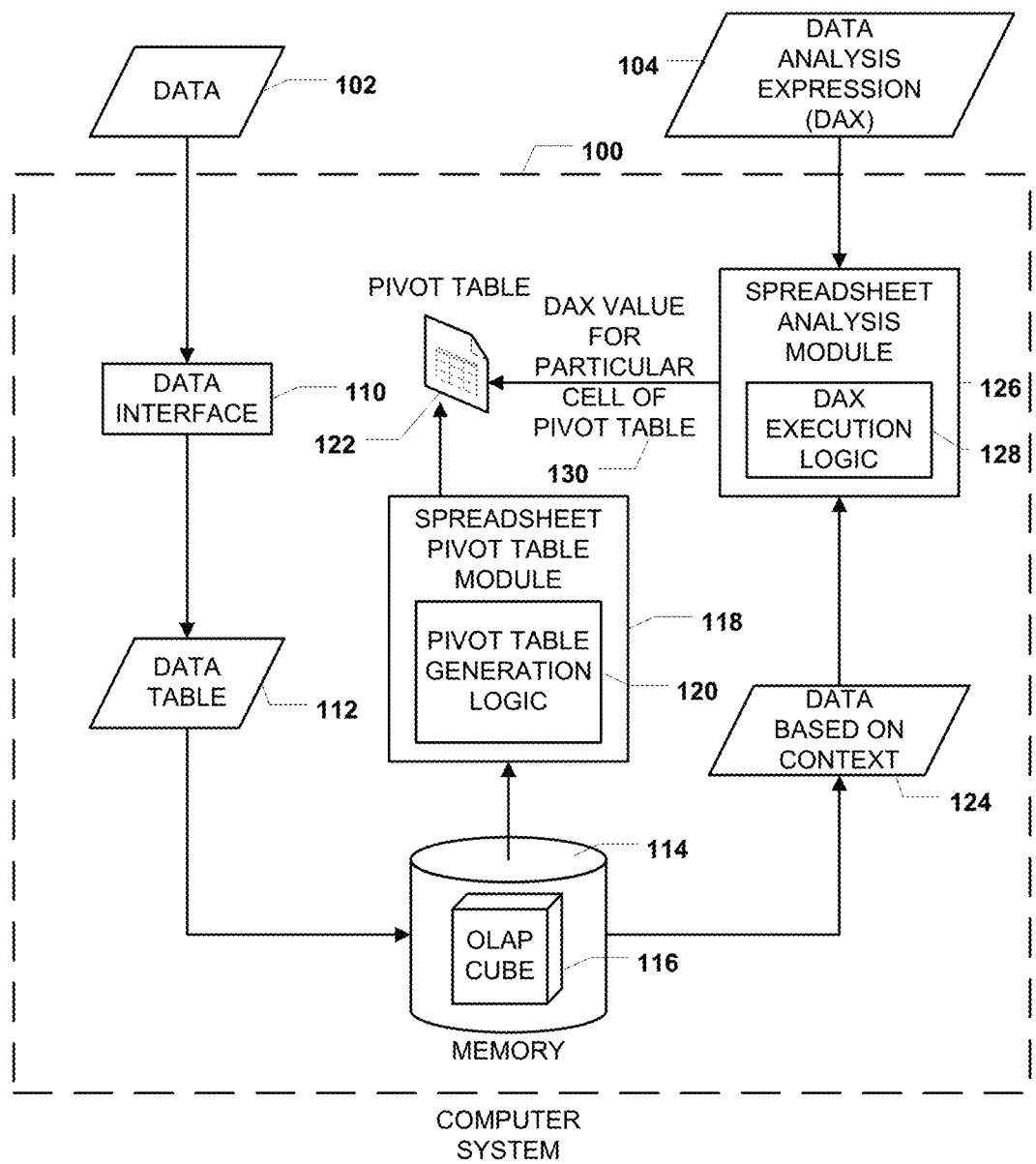
FIG. 1 is a block diagram to illustrate a particular embodiment of a computer system to receive and process data analysis expressions.

Data analysis expressions (DAXs) may enable multi-dimensional data analysis at conventional data processing application, such as a spreadsheet application. For example, a DAX may be received as a column definition for a column of a spreadsheet table or as a measure at a pivot table. The DAX may be executed to populate the column, where the value in each cell is calculated based on a row context for that cell. Alternately, cells of the pivot table may be populated by executing the DAX, where the value in each cell of the pivot table is calculated based on a context (e.g., a filter context) associated with that cell.

In a particular embodiment, a computer-implemented method is disclosed that includes receiving a data analysis expression at a pivot table of a spreadsheet. The computer implemented method also includes executing the data analysis expression with respect to at least one data table of the spreadsheet. Executing the data analysis expression for a particular cell of the pivot table may be performed by determining a context associated with the particular cell, calculating a value of the data analysis expression based on the context, and outputting the calculated value at the cell.

In another particular embodiment, a computer-readable medium is disclosed that includes instructions, that when executed by a processor, cause the processor to receive input including a column definition of a particular column of a first spreadsheet table. The input includes a data analysis expression based on at least one column of the spreadsheet table and based on at least one column of a second spreadsheet table. The computer-readable medium includes instructions, that when executed by the processor, cause the processor to determine a relationship between the first spreadsheet table and the second spreadsheet table and to populate the particular column by executing the data analysis expression. Executing the data analysis expression for a particular row of the first spreadsheet table includes calculating a value of the data analysis expression based on first data in the particular row of the first spreadsheet table and second data retrieved from the second spreadsheet table based on a row context associated with the particular row. Executing the data analysis expression also includes outputting the calculated value at cell that is a member of the particular column and the particular row.

In another particular embodiment, a system is disclosed. The system includes a memory and a data interface configured to receive data, to create one or more data tables based on the received data, and to store the data tables in a column-based in-memory store (e.g., a structure that maps to an online analytical processing (OLAP) cube structure). The system also includes a pivot table module configured to generate a pivot table based on the data table(s). The system further includes an analysis module configured to receive a data analysis expression and execute the data analysis expression with respect to at least one column of the data table(s). Executing the data analysis expression for a particular cell of the pivot table includes determining a filter context associated with the particular cell and retrieving data associated with one or more rows of the data table corresponding to the filter context of the particular cell. Executing the data analysis expression also includes calculating a value of the data analysis expression based on the retrieved data and outputting the calculated value at the cell.

FIG. 1 is a block diagram to illustrate a particular embodiment of a computer system 100 to receive and process data analysis expressions (DAXs). The computer system 100 includes a data interface 110 and a memory 114. The computer system 100 includes a spreadsheet analysis module 126 and a spreadsheet pivot table module 118. Generally, the computer system 100 may receive and process DAXs, such as an illustrative DAX 104. The DAXs may have syntax similar to existing spreadsheet formulae and may enable multi-dimensional (e.g. multi-table and/or multi-column) data analysis at the computer system 100.

The computer system 100 includes the data interface 110 that is configured to receive data 102. In a particular embodiment, the data 102 is provided by a user of the computer system 100. Alternately, the data 102 may be received from another computer system, a network storage device, or a network share. The data interface 110 is further configured to create a data table 112 based on the received data at a memory 114 using an in-memory column-based store. For example, the data interface 110 may create a table within a spreadsheet application (e.g., a spreadsheet table), where the table includes the data 102. An online analytical processing (OLAP) cube 116 data structure may be constructed at the memory 114 based on the in-memory column-based store. An OLAP cube may store data arranged such that each of the three dimensions (i.e., axes) of the OLAP cube provide a different arrangement of the data. For example, an OLAP cube may structure sales data arranged by date, product identifier, and customer identifier, as further described herein with reference to FIGS. 3-6. Alternately, the data table 112 may be stored in another data structure, such as an OLAP hypercube (e.g., an OLAP data structure having more than three dimensions) or some other in-memory column store. Storage of the data table 112 in the OLAP cube 116 at the memory 114 (e.g., random access memory (RAM) of the computer system 100) may help in facilitating multi-dimensional data analysis and pivot table operations as described herein. Data tables are further described herein with respect to FIGS. 3 and 5.

The computer system 100 also includes a spreadsheet pivot table module 118. In an illustrative embodiment, the spreadsheet pivot table module 118 is part of a spreadsheet application of the computer system 100. The spreadsheet pivot table module 118 includes logic 120 to generate a pivot table 122 based on the data table 112 referenced by the OLAP cube 116. The pivot table 122 may support "pivot" operations, where row headers, column headers, filters, or slicers of the pivot table 122 are changed and data values in the pivot table 122 are automatically updated to reflect the changes. In a particular embodiment, updating the pivot table 122 in response to a pivot operation includes re-executing a query of the in-memory OLAP cube 116, so that data from the OLAP cube is arranged and viewed along different dimensions of the OLAP cube. Pivot tables are further described herein with reference to FIGS. 4 and 6.

The computer system 100 further includes a spreadsheet analysis module 126. In an illustrative embodiment, the spreadsheet analysis module 126 is part of a spreadsheet application of the computer system 100. The spreadsheet analysis module 126 is configured to receive the DAX 104 and includes DAX execution logic 128 configured to execute the DAX 104. For example, the spreadsheet analysis module 126 may execute the DAX 104 with respect to the data table 112. Executing the DAX for a particular cell of the pivot table 122 includes determining a filter context for the particular cell as well as the row context(s) for tables referenced by the DAX 104, retrieving data 124 based on the row context(s) (e.g., data associated with one or more rows of the data table 112) from the OLAP cube 116, calculating a value 130 of the DAX 104 based on the retrieved data, and outputting the calculated value 130 at the cell of the pivot table. Thus, populating the pivot table 122 may include automatic recursive executions of the DAX 104 with respect to different contexts and cross-filtering of multiple data tables. Alternately, calculations may be performed in a block mode, so that calculations for multiple cells of the pivot table may be performed simultaneously.

In a particular embodiment, the DAX 104 includes a formula to be aggregated over multiple rows of the data table 112. The formula may be a user-defined formula expressed in a native formula language of a spreadsheet application that includes the modules 118, 126, without referring to specific cell ranges of the spreadsheet application. Thus, DAXs (e.g., the DAX 104) may enable table-based (e.g., column based) multi-dimensional data analysis (as opposed to conventional spreadsheet cell-based analysis) while incorporating existing spreadsheet formulae that users are familiar with. For example, the DAX 104 may include aggregations (e.g., sum, average, minimum, maximum, or count), time-based functions (e.g., days, weeks, months, quarters, years, first and last date, first and last non blank date, start and end of month/quarter/year, dateadd, datesbetween, datesinperiod, parallelperiod, previous day/month/quarter/year, next day/month/quarter/year, month/quarter/years dates to current date, sameperiodlastyear, aggregateover month/quarter/year, or opening and closing monthly/quarterly/yearly balance), or any combination thereof. The DAX may further include apply functions, groupby functions, semijoin functions, lookupvalues functions, earlier/earliest functions (e.g., to refer to a previous value at a cell), intersect functions, except functions, union functions, select functions, join functions, topN functions, rank functions, or any combination thereof. The DAX 104 may also include specialized table-based functions having syntax similar to commonly used spreadsheet formulae. For example, the DAX 104 may include a related table function, a relatedtable table function, a filter table function, a distinct table function, a values table function, an all table function, an allexcept table function, an allnoblankrow table function, or any combination thereof.

In operation, the data table 112 may be created based on the data 102 received by the data interface 110. It should be noted that operation with respect to a single data table 112 is provided for illustrative purposes only. There may be any number of data tables and data sources. The data table 112 may be used as a data source for the OLAP cube 116 in the memory 114. A spreadsheet application user may desire to perform analysis on the data table 112 through the use of a pivot table 122. The pivot table 122 may be generated by the spreadsheet pivot table module 118. In defining measures output by the pivot table 122, the user may input a DAX 104. The spreadsheet analysis module 126 may populate the cells of the pivot table 122 by executing the DAX 104. Populating a particular cell of the pivot table 122 may include determining a filter context associated with the particular cell, calculating the DAX value 130 for the particular cell based on the context, and outputting the calculated DAX value 130 at the cell.

In a particular embodiment, execution of DAXs involves a hybrid iterator-based and lookup-based execution strategy. In another particular embodiment, executing a DAX may include cross-application of a canonical form (e.g., a non-relational algebra form) of an execution tree for the DAX. In another particular embodiment, DAX execution may include dependency analysis to determine what sub-calculations a calculated column depends on. Based on the dependency analysis, an order for calculating the sub-calculations may be determined. For example, if the value A in a calculated column depends on the results of three sub-calculations B, C, and D, then a rule may be generated that results in the calculation of each of B, C, and D before an attempt to calculate A.

It should be noted that although the particular embodiment illustrated in FIG. 1 depicts the use of DAXs in pivot tables, DAXs may also be used without pivot tables. For example, the DAX 104 may be entered at a spreadsheet application as a column definition of a particular column of the data table 112. The DAX 104 may be based on one or more columns of the data table 112 (and possibly additional tables) other than the particular column. Populating a cell of the particular column may include determining a row context for the cell, calculating a value of the DAX 104 based on the row context, and outputting the calculated value for the DAX 104 at the cell. In another embodiment, the DAX 104 may additionally be based on at least one column of a second data table. In such an embodiment, calculating a value for the DAX may include retrieving data from the second data table based on a relationship between the data table 112 and the second data table. For example, the data table 112 may include a column containing a value that may be found in a related column (e.g., an index column) of the second data table. In a particular embodiment, the second data table is involved in the calculation even when no relationship exists. For example, executing the DAX 104 may include filtering the second data table to include rows that pertain to data values in the data table 112. The resulting filtered rows may then be aggregated by the DAX. It should be noted that the relationship (e.g., related column) between the data table 112 and the second data table may exist even when the related column has a different name in the data table 112 than in the second data table. Relationships between data tables are further described with respect to FIGS. 5-6.

It will be appreciated that the system 100 of FIG. 1 may enable, via DAXs, advanced data analysis not enabled by generic spreadsheet formulae. It will further be appreciated that the system 100 of FIG. 1 may enable such advanced analysis based on multiple tables without references to particular cell ranges of a spreadsheet.

Figure 2:
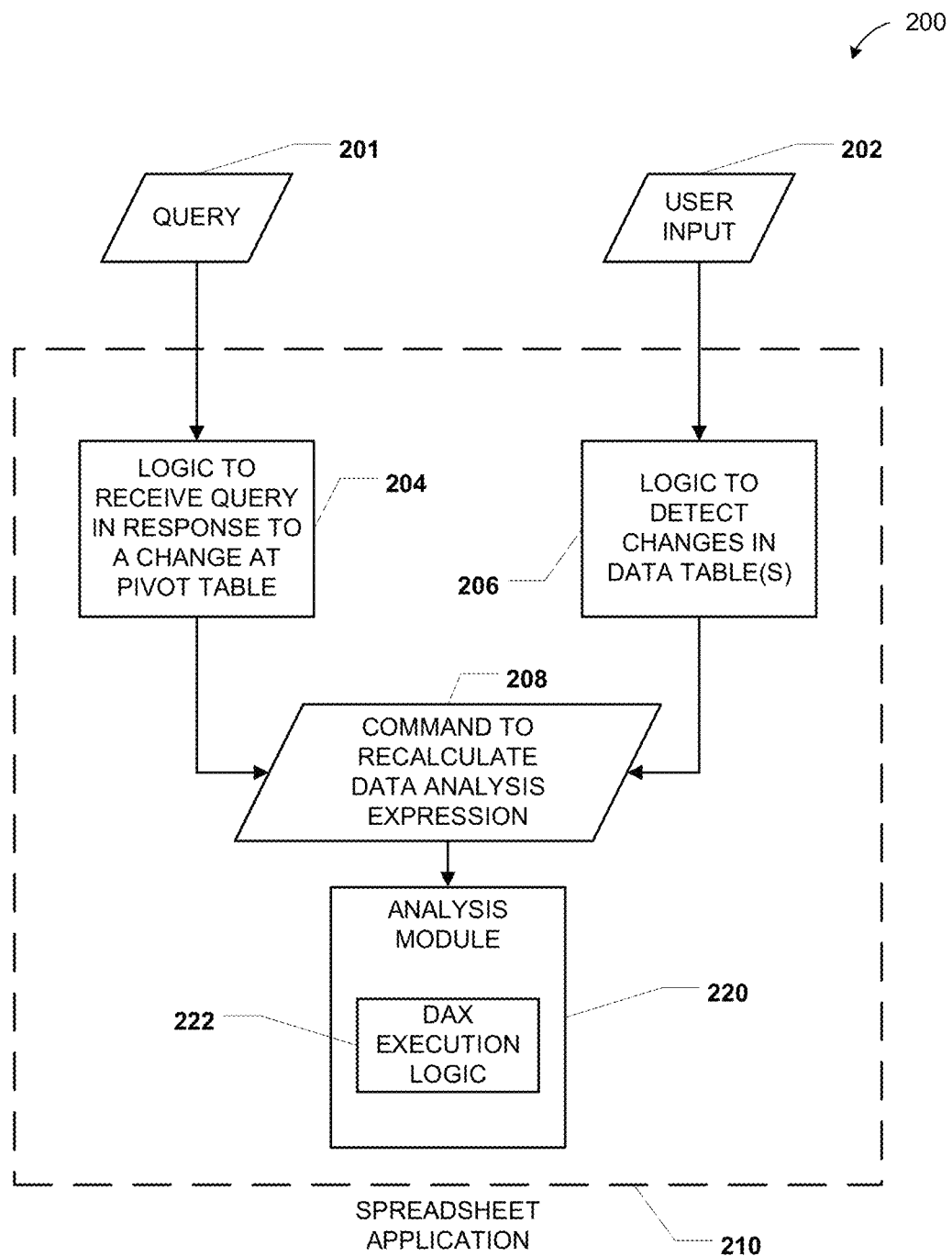
FIG. 2 is a block diagram to illustrate another particular embodiment of a computer system to receive and process data analysis expressions.

FIG. 2 is a block diagram to illustrate another particular embodiment of a computer system 100 to receive and process DAXs. The system 200 includes a spreadsheet application 210 configured to receive user input 202. The spreadsheet application 210 also includes an analysis module 220. In an illustrative non-limiting embodiment, the analysis module 220 is the spreadsheet analysis module 126 of FIG. 1 and includes DAX execution logic 222 similar to the DAX execution logic 128 of FIG. 1.

The spreadsheet application 210 may include logic 204 configured to receive a query 201 in response to a change at a pivot table at the spreadsheet application 210. For example, the logic 204 may receive the query 201 in response to a user changing a setting at the pivot table 122 of FIG. 1. In response to receiving the query 201, the logic 204 may automatically generate a command 208 to recalculate a DAX associated with the pivot table and send the command 208 to the analysis module 220.

The spreadsheet application 210 may include logic 206 configured to detect changes in one or more data tables at the spreadsheet application 210. For example, the logic 206 may be configured to detect changes at a data table such as the pivot table 112 of FIG. 1. The changes may be detected based on user input 202. For example, the user input 202 may include a new value for a cell of the data table. In response to detecting changes in the data table(s), the logic 206 may automatically generate the command 208 to recalculate a DAX (e.g., a column definition DAX) associated with the changed data table(s) and send the command 208 to the analysis module 220.

In response to receiving the command 208, the analysis module 220 may automatically recalculate one or more DAXs at the spreadsheet application. For example, the analysis module 220 may automatically recalculate column definition DAXs at data tables of the spreadsheet application 210, DAXs at a pivot table of the spreadsheet application 210, or any combination thereof.

It will be appreciated that the system 200 of FIG. 2 may improve user experience at the spreadsheet application 210 by enabling automatic recalculation of DAXs. Thus, users of the spreadsheet application may make changes to data tables and pivot tables and observe corresponding changes in DAX values without redefining and manually re-executing the DAXs. It will therefore be appreciated that once entered, a DAX may be used to perform multi-dimensional data analysis multiple times with respect to changing data.

Figure 4:
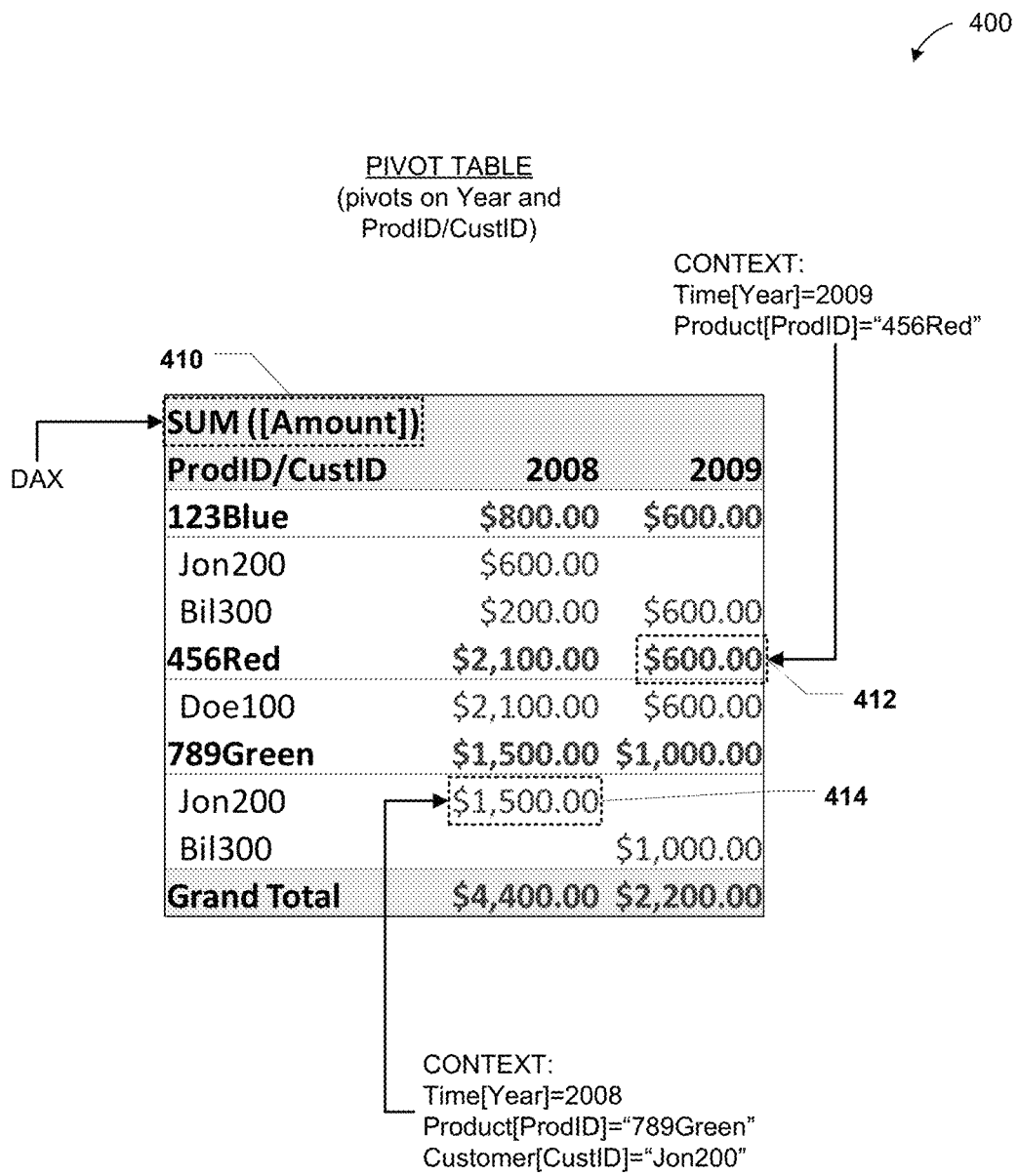
FIG. 4 illustrates a particular embodiment of a pivot table based on the data table of FIG. 3.

FIGS. 3-4 illustrate a particular embodiment of the data table 112 of FIG. 1 (illustrated as a sales table 300) and a pivot table 400 generated based on the sales table 300. The sales table 300 includes one or more rows 310 and columns 320, 330, 340, 350, 360, and 370. In an illustrative embodiment, the sales table 300 includes the data table 112 of FIG. 1.

Each of the rows 310 of the sales table 300 may represent a sales transaction and each column 320-370 of the sales table 300 may represent data associated with a sales transaction. For example, the column 320 may represent a date of a particular sale, the column 330 may represent a customer identifier (CustID) indicating which customer paid for the particular sale, the column 340 may represent a product identifier (ProdID) indicating which product was paid for, the column 350 may represent a quantity of products sold, the column 360 may represent a price charged for each of the products sold, and the column 370 may represent a total amount 370 generated by sale. In a particular embodiment, the amount column 370 is defined by a spreadsheet formula (e.g., "=Qty*Price"). The sales table 300 further includes a static sum aggregation 380 for the amount column 370.

It should be noted that column references included in a DAX may be polymorphic. That is, a column reference in a DAX may resolve to a column when used in a column calculation and may resolve to a value stored at a particular row of the column when used in a scalar calculation. For example, when used in a column calculation, the column reference "Amount" may resolve to the column 370, but when used in a scalar calculation the reference "Amount" may resolve to the value of Qty*Price stored at a particular row of the rows 310 of FIG. 3. It should also be noted that a DAX, or a part thereof, may include functions or formulae that may result in a table useable as an intermediate result of a scalar calculation.

In the particular embodiment illustrated in FIG. 4, the pivot table 400 pivots on the data column 320 and a combination of the ProdID column 340 and the CustID column 330 of the sales table 300 of FIG. 3. That is, the pivot table 400 may aggregate data based on date and ProdID/CustID contexts from the sales table 300 of FIG. 3. For example, a DAX 410 "SUM[Amount]" may be received at the pivot table 400, indicating a desire that the cells of the pivot table 400 contain a sum aggregation of the amount column 370 of FIG. 3 for various combinations (i.e., contexts) of date, ProdID, and CustID of the sales table 300 of FIG. 3. Accordingly, a first illustrative cell 412 of the pivot table 400 indicates an amount received from selling "456Red" products during 2009 regardless of customer and a second illustrative cell 414 indicates an amount received from selling "789Green" products to customer "Jon200" during 2008. That is, a first context associated with the first cell 412 may be "Time[Year]=2009; Product[ProdID]='456Red'" and a second context associated with the second cell 414 may be "Time[Year]=2008; Product[ProdID]='789Green'; Customer[CustID]='Jon200'."

It should be noted that contexts may also include inequalities. For example, products purchased by the customer "Jon200" that cost more than $200 may be determined using the context "Customer[CustID]='Jon200'; Product[Price]>200.00".

It should also be noted that the pivot table 400 may also be generated using a different DAX than the DAX 410. For example, if the amount column 370 of FIG. 3 did not exist, the pivot table 400 may be generated by incorporating the "=Qty*Price" formula of the amount column 370 into the DAX 410. For example, the DAX 410 may be "SUM[Qty*Price]."

It will be appreciated that multiple cells of the pivot table 400 of FIG. 4 may be populated based on contexts associated with the sales table 300 of FIG. 3 without entering the DAX 410 of FIG. 4 multiple times. Instead, the DAX 410 of FIG. 4 may be automatically recursively re-executed for each cell of the pivot table 400 of FIG. 4 based on a different context associated with each cell of the pivot table 400 of FIG. 4. It will further be appreciated that the static sum aggregation 380 may indicate a total of all products sold, but the DAX 410 may instead be used to provide a multi-dimensional view of the products sold (e.g., total by product, total by year, and total by combination of product and year).

Figure 5:
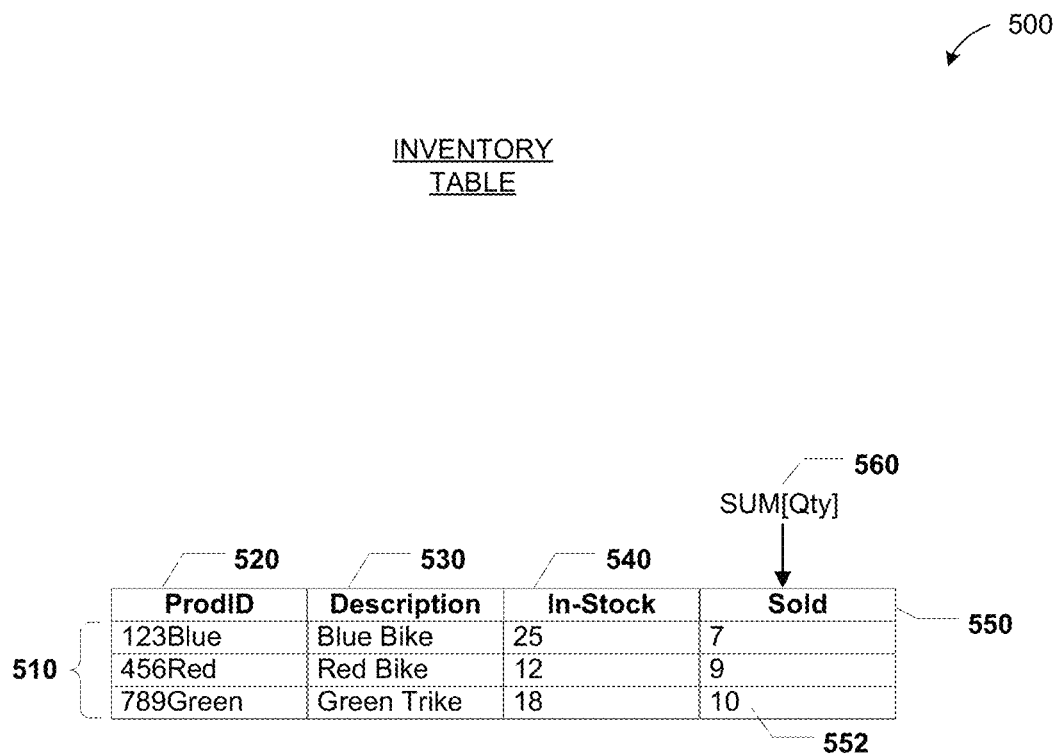
FIG. 5 illustrates another particular embodiment of a data table useable by the system of FIG. 1.
Figure 6:
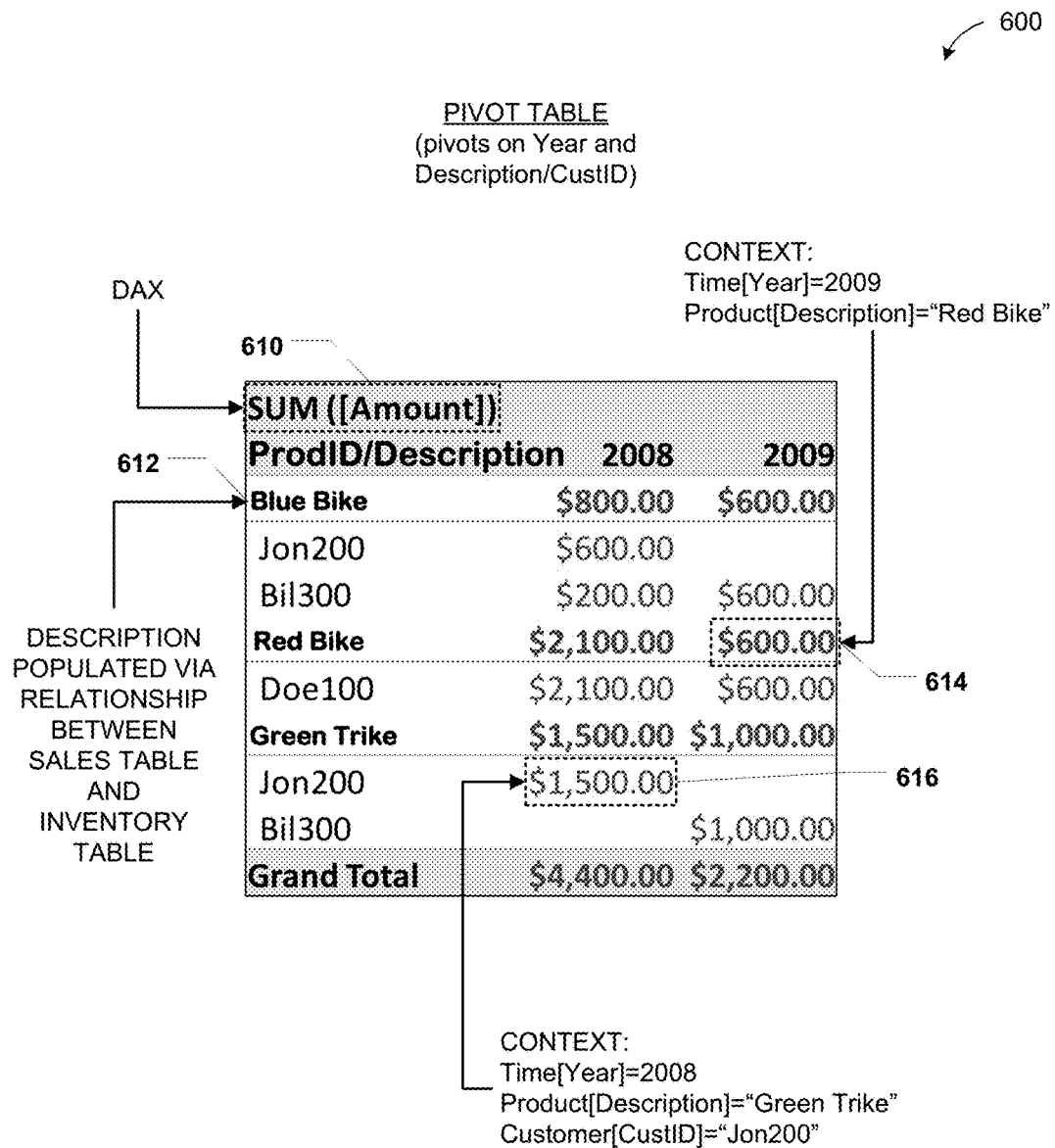
FIG. 6 illustrates a particular embodiment of a pivot table based on the data table of FIG. 3 and the data table of FIG. 5.

FIGS. 5-6 illustrate another particular embodiment of the data table 112 of FIG. 1 (illustrated as an inventory table 500) and a pivot table 600 based on the data tables of FIG. 3 and FIG. 5 (e.g., the sales table 300 of FIG. 3 and the inventory table 500 of FIG. 5). Each of the rows 510 of the inventory table 500 may represent a particular product available for sale and columns 520-540 may represent data associated with the particular product. For example, the column 520 may represent a product identifier (ProdID) of the particular product, the column 530 may represent a description of the particular product, and the column 540 may represent how many units of the particular product are currently in-stock.

One or more columns of the inventory table 500 may also include a DAX column definition. For example, the units sold column 550 has an associated DAX column definition "SUM[Qty]" 560. Rows of the units sold column 550 may be populated by aggregating the Qty column 350 of FIG. 3 for various products. For example, the cell 552 may be populated by filtering the sales table 300 of FIG. 3 for rows that have a ProdID of '789Green' and then aggregating the Qty column of rows that remain. It will be appreciated that to populate the cell 552, a relationship (e.g., a previously user-defined relationship) between the sales table 300 of FIG. 3 and the inventory table 500 of FIG. 5 (e.g., that the ProdID columns 370 of FIG. 3 and 520 of FIG. 5 are related) may automatically be identified and traversed. It should be noted that filtering a table (e.g., the sales table 300 of FIG. 3) may include Boolean filters as well as table-based filters.

The pivot table 600 may pivot on columns of multiple data tables. In the particular embodiment illustrated in FIG. 6, the pivot table 600 pivots the date column 320 of FIG. 3 and a combination of the description column 530 of FIG. 5 and CustID column 330 of FIG. 300. That is, although the pivot table 600 aggregates data from one table, the sales table 300 of FIG. 3, the aggregation may be based on contexts from both the sales table 300 of FIG. 3 and the inventory table 500 of FIG. 5.

The pivot table 600 may receive a DAX 610 "SUM[Amount]" similar to the DAX 410 of FIG. 4, and the value of the DAX 610 may be recursively calculated to populate cells of the pivot table 600. Populating the pivot table 600 may include identifying a relationship between the sales table 300 of FIG. 3 and the inventory table 500 of FIG. 5 and retrieving data from both the sales table 300 of FIG. 3 and the inventory table 500 of FIG. 5. For example, in the particular embodiment illustrated in FIG. 6, a relationship between the tables 300 of FIG. 3 and 500 of FIG. 5 may automatically be identified. The relationship may include the related columns 340 of FIG. 3 and 520 of FIG. 5, both of which are product identifier (ProdID) columns. In a particular embodiment, the related columns are index columns. Thus, a row header 612 "Blue Bike" of the pivot table 600 may be populated based on the identified relationship between the sales table 300 of FIG. 3 and the inventory table 500 of FIG. 5. A first illustrative cell 614 of the pivot table 600 may be associated with a first context "Time[Year]=2009; Product[Description]='Red Bike'" and a second illustrative cell 616 of the pivot table 600 may be associated with a second context "Time[Year]=2008; Product[Description]='Green Trike'; Customer[CustID]='Jon200'."

It will thus be appreciated that DAXs (e.g., the DAXs 560 of FIG. 5 and 610 of FIG. 6) may enable multi-dimensional data analysis across multiple tables (e.g., the sales table 300 of FIG. 3 and the inventory table 500 of FIG. 5). It will further be appreciated that such multi-dimensional data analysis may occur at the tables themselves (e.g., at the column 550 of FIG. 5) as well as at a pivot table (e.g., the pivot table 600 of FIG. 6).

Figure 7:
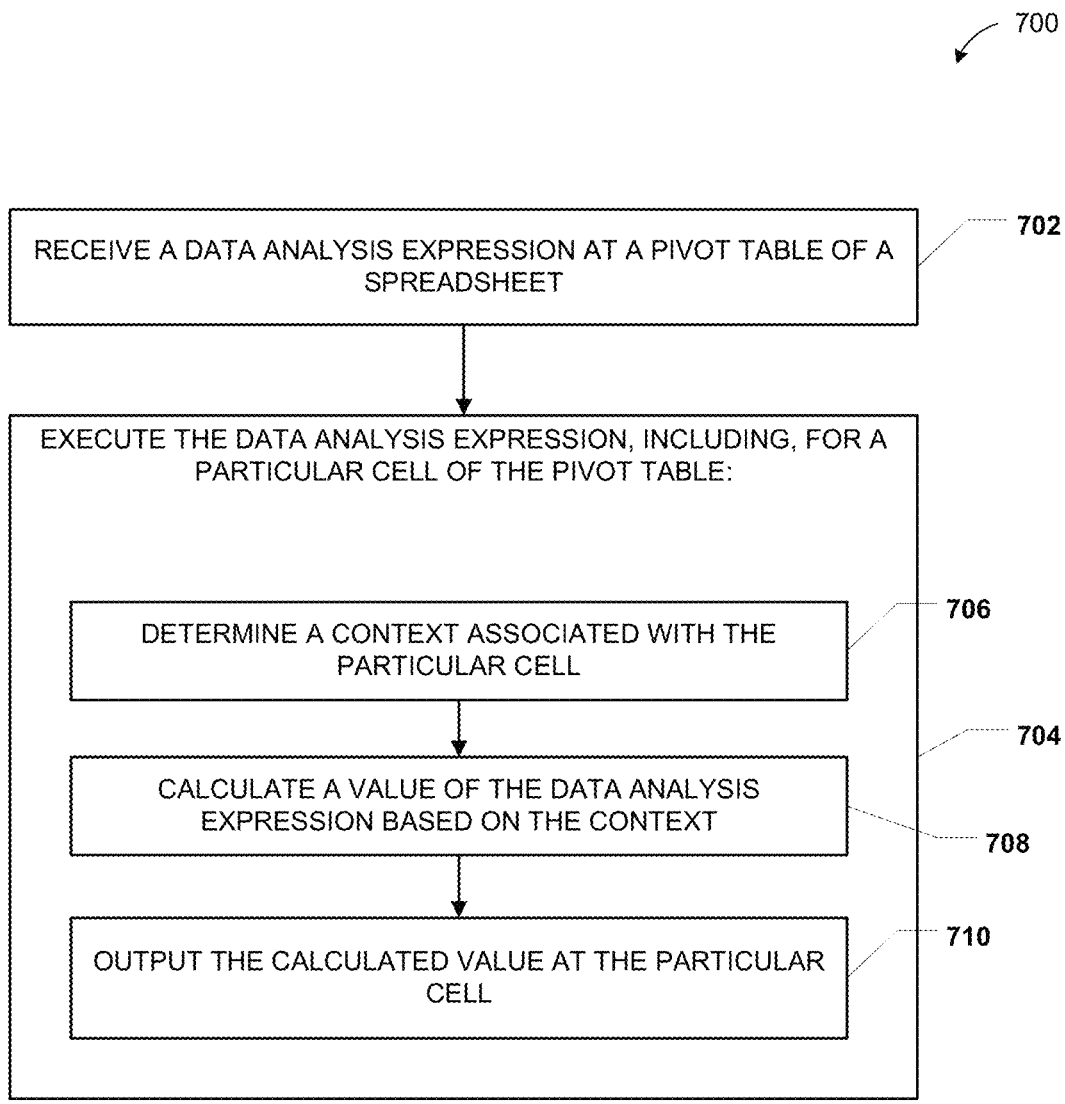
FIG. 7 is a flow diagram to illustrate a particular embodiment of a method of receiving and processing data analysis expressions.

FIG. 7 is a flow diagram to illustrate a particular embodiment of a method 700 of receiving and processing data analysis expressions. In an illustrative embodiment, the method 700 may be performed by the system 100 of FIG. 1.

The method 700 includes receiving a DAX at a pivot table of a spreadsheet, at 702. For example, in FIG. 1, the DAX 104 may be received at the pivot table 122. To illustrate, referring to FIG. 4, the DAX may be the DAX "SUM [Amount]" 410.

The method 700 also includes executing the DAX, at 704. For example, in FIG. 1, the spreadsheet analysis module 126 may execute the DAX 104. With respect to a particular cell of the pivot table, executing the DAX includes determining a context associated with the particular cell, at 706, calculating a value of the DAX based on the context, at 708, and outputting the calculated value at the particular cell, at 710. For example, in FIG. 1, a context may be determined, the data 124 based on the context may be retrieved, and the DAX value 130 may be calculated and output at the particular cell of the pivot table 122. To illustrate, referring to FIG. 4, the particular cell may be the cell 414 of FIG. 4, the context may be "Time[Year]=2008; Product [ProdID]='789Green'; Customer[CustID]='Jon200'," and the calculated value of the DAX output at the cell 414 may be "$1,500."

Figure 8:
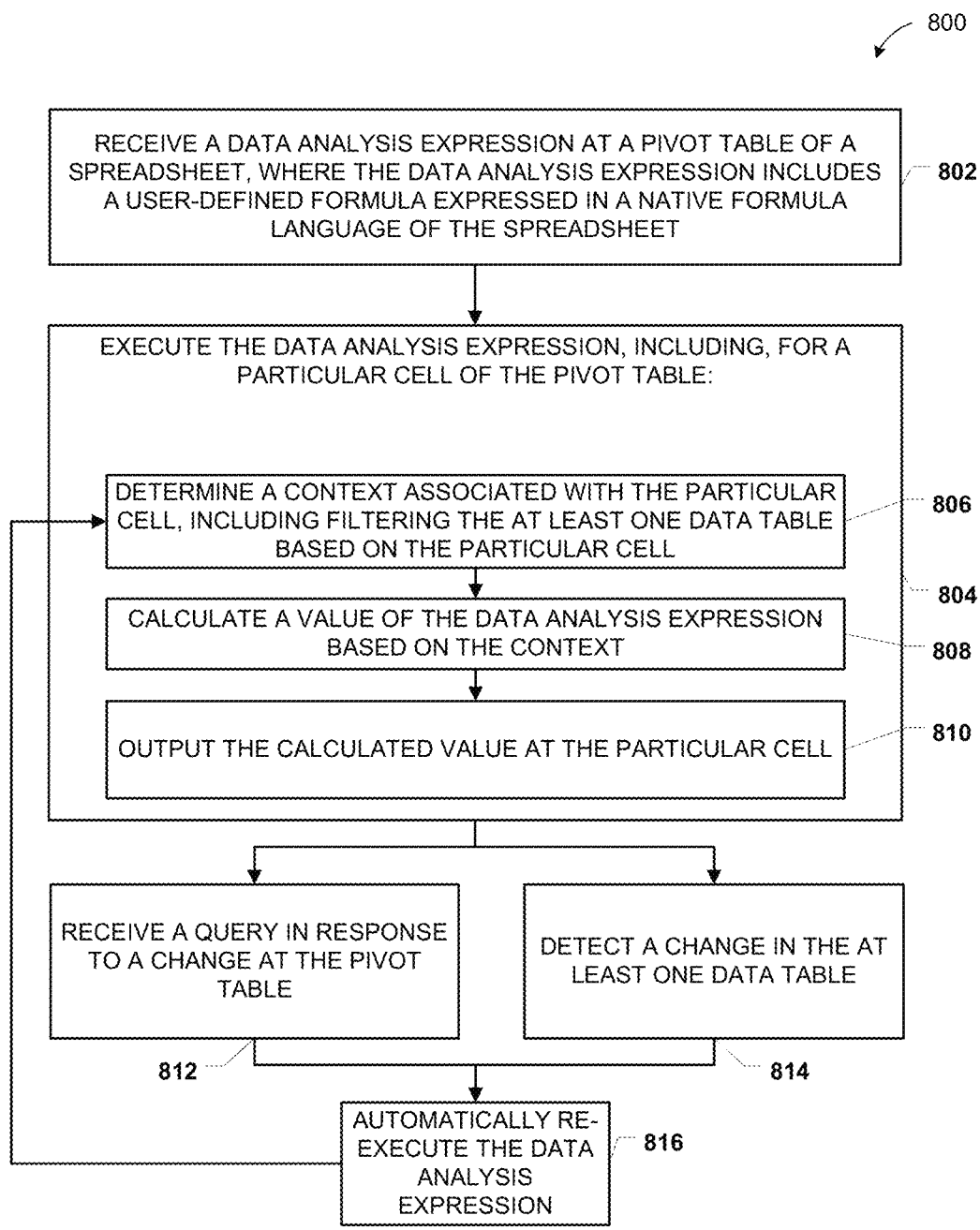
FIG. 8 is a flow diagram to illustrate another particular embodiment of a method of receiving and processing data analysis expressions.

FIG. 8 is a flow diagram to illustrate another particular embodiment of a method 800 of receiving and processing data analysis expressions. In an illustrative embodiment, the method 800 may be performed by the system 100 of FIG. 1 or by the system 200 of FIG. 2.

The method 800 includes receiving a DAX at a pivot table of a spreadsheet, at 802. The DAX includes a user-defined formula expressed in a native formula language of the spreadsheet (e.g., the DAX may include existing spreadsheet functions and may include syntax similar to existing spreadsheet functions). For example, in FIG. 1, the DAX 104 may be received at the pivot table 122.

The method 800 also includes executing the DAX, at 804. For example, in FIG. 1, the spreadsheet analysis module 126 may execute the DAX 104. With respect to a particular cell of the pivot table, executing the DAX 104 includes determining a context associated with the particular cell, including filtering the at least one data table based on the particular cell, at 806. Executing the DAX 104 also includes calculating a value of the DAX 104 based on the context, at 808, and outputting the calculated value at the particular cell, at 810. For example, in FIG. 1, a context may be determined, the data table 112 may be filtered based on the context (e.g., rows that do not match the context may temporarily be hidden or ignored), the data based on the context 124 may be retrieved, and the DAX value 130 may be calculated and output at the particular cell of the pivot table 122.

The method 800 further includes receiving a query in response to a change at the pivot table, at 812, or detecting a change at the at least one data table, at 814. For example, in FIG. 1, a pivot operation of the pivot table 122 may occur or a change in the data table 112 may be detected. In an illustrative embodiment, the query is received as described herein with respect to the logic 204 of FIG. 2 and the change at the at least one data table is detected as described herein with respect to the logic 206 of FIG. 2.

The method 800 includes automatically re-executing the DAX 104, at 816, by returning to 806. For example, in FIG. 1, the spreadsheet analysis module 126 may automatically re-execute the DAX 104. In an illustrative embodiment, the automatic re-execution of the DAX 104 is performed as described herein with respect to the command 208 and the module 220 of FIG. 2.

Figure 9:
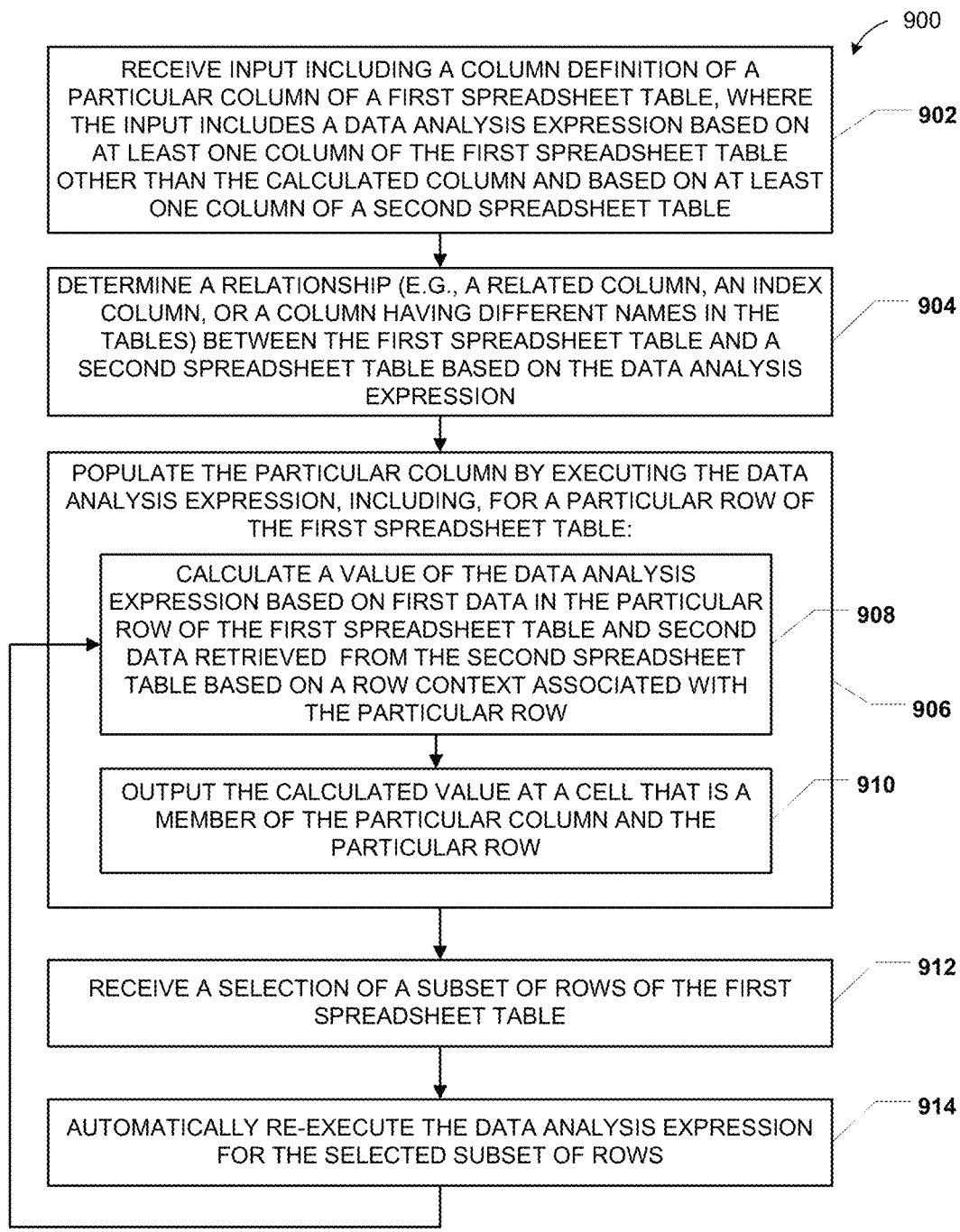
FIG. 9 is a flow diagram to illustrate another particular embodiment of a method of receiving and processing data analysis expressions.

FIG. 9 is a flow diagram to illustrate another particular embodiment of a method 900 of receiving and processing data analysis expressions. In an illustrative embodiment, the method 900 may be performed by the system 100 of FIG. 1.

The method 900 includes receiving input including a column definition of a particular column of a first spreadsheet table, at 902. The input includes a DAX based on at least one column of the first spreadsheet table and based on at least one column of a second spreadsheet table. For example, referring to FIG. 5, the DAX "SUM[Qty]" 560 may be received as a column definition for the column 550, where the DAX 560 refers to both the sales table 300 of FIG. 3 and the inventory table 500 of FIG. 5.

The method 900 also includes determining a relationship between the first spreadsheet table and the second spreadsheet table based on the DAX, at 904. In a particular embodiment, the relationship is a related column, an index column, or a column having different names in the two spreadsheet tables. For example, a relationship between the sales table 300 of FIG. 3 and the inventory table 500 of FIG. 5 may be identified, such as identifying the ProdID columns 340 of FIG. 3 and 520 of FIG. 5 as related columns.

The method 900 further includes populating the particular column by executing the DAX, at 906. Executing the DAX for a particular row of the first spreadsheet table includes calculating a value of the DAX, at 908, and outputting the calculated value at a cell that is a member of the particular row and the particular column, at 910. The value is calculated based on first data in the particular row of the first spreadsheet table and based on second data retrieved from the second table based on a row context associated with the particular row. For example, referring to FIG. 5, the cell 552 may be populated by aggregating rows of the sales table 300 matching the row context "Product[ProdID]='789Green'" and outputting the resulting value at the cell 552.

The method 900 includes receiving a selection of a subset of rows of the first spreadsheet table, at 912, and automatically re-executing the DAX for the selected subset of rows, at 914, by returning to 908. For example, referring to FIG. 5, a selection of one or more of the rows 510 may be received and the DAX 560 may be re-executed for the selected rows.

Figure 10:
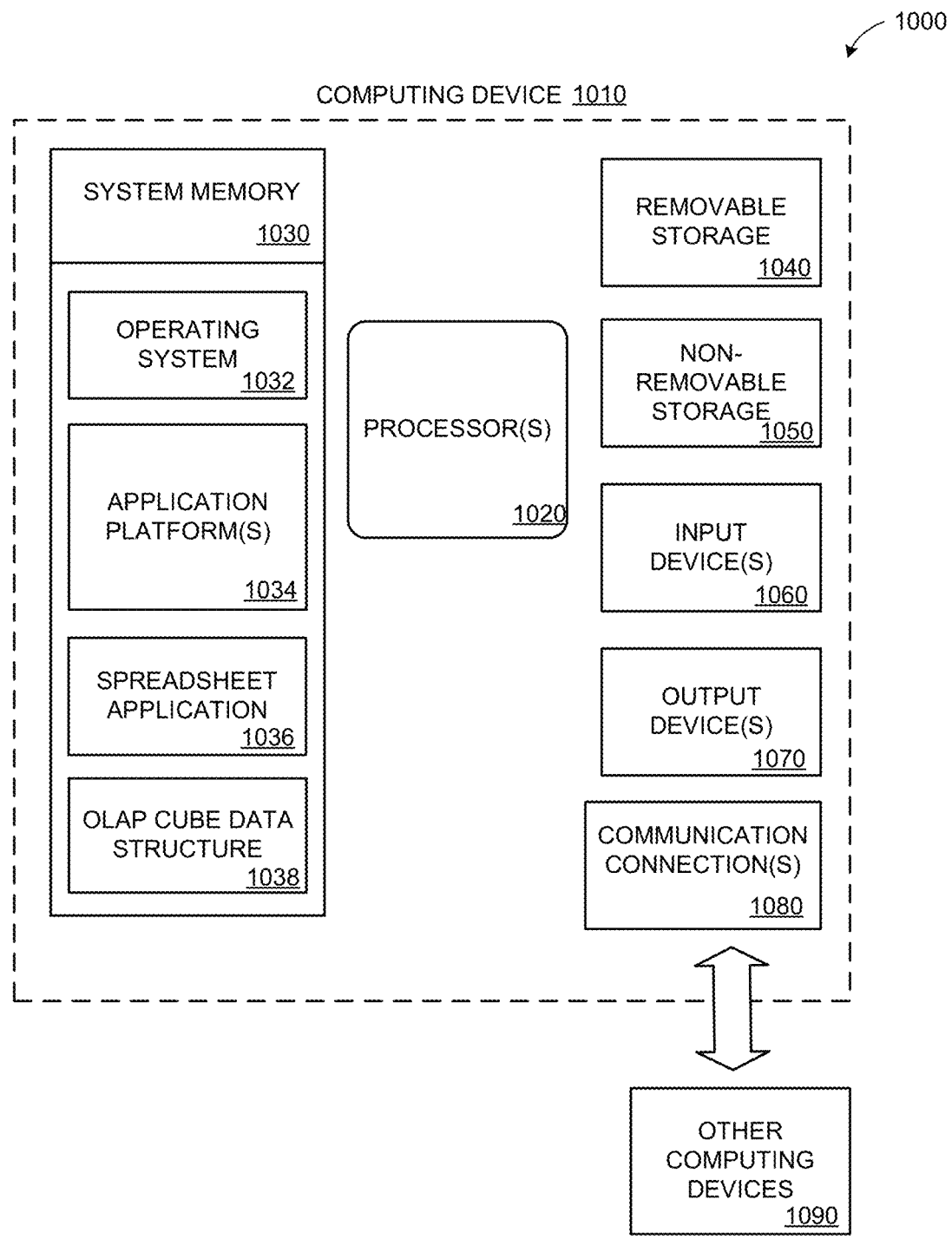
FIG. 10 is a block diagram of a computing environment including a computing device operable to support embodiments of computer-implemented methods, computer program products, and system components as illustrated in FIGS. 1-9.

FIG. 10 depicts a block diagram of a computing environment 1000 including a computing device 1010 operable to support embodiments of computer-implemented methods, computer program products, and system components according to the present disclosure. In an illustrative embodiment, the computing device 1010 may include the data interface 110 of FIG. 1, the memory 114 of FIG. 1, the modules 118, 126 of FIG. 1, the logic 204-206 of FIG. 2, or the module 220 of FIG. 2. Each of the data interface 110 of FIG. 1, the memory 114 of FIG. 1, the modules 118, 126 of FIG. 1, the logic 204-206 of FIG. 2, or the module 220 of FIG. 2 may include the computing device 1010 or a portion thereof.

The computing device 1010 includes at least one processor 1020 and system memory 1030. Depending on the configuration and type of computing device, the system memory 1030 may be volatile (such as random access memory or "RAM"), non-volatile (such as read-only memory or "ROM," flash memory, and similar memory devices that maintain stored data even when power is not provided) or some combination of the two. The system memory 1030 typically includes an operating system 1032, one or more application platforms 1034, one or more applications (e.g., a spreadsheet application 1036), and may include program data associated with the one or more applications (e.g., an OLAP cube data structure 1038). In an illustrative embodiment, the spreadsheet application 1036 is the spreadsheet application 210 of FIG. 2 and the OLAP cube data structure 1038 is the OLAP cube data structure 116 of FIG. 1. In an illustrative embodiment, the system memory 1030 may include one or more logical components or modules as disclosed herein. For example, the system memory 1030 may include one or more of the modules 118, 126 of FIG. 1, the logic 204-206 of FIG. 2, or the module 220 of FIG. 2.

The computing device 1010 may also have additional features or functionality. For example, the computing device 1010 may also include removable and/or non-removable additional data storage devices such as magnetic disks, optical disks, tape, and standard-sized or miniature flash memory cards. Such additional storage is illustrated in FIG. 10 by removable storage 1040 and non-removable storage 1050. Computer storage media may include volatile and/or non-volatile storage and removable and/or non-removable media implemented in any method or technology for storage of information such as computer-readable instructions, data structures, program components or other data. The system memory 1030, the removable storage 1040 and the non-removable storage 1050 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 1010. Any such computer storage media may be part of the computing device 1010. The computing device 1010 may also have input device(s) 1060, such as a keyboard, mouse, pen, voice input device, touch input device, etc. Output device(s) 1070, such as a display, speakers, printer, etc. may also be included.

The computing device 1010 also contains one or more communication connections 1080 that allow the computing device 1010 to communicate with other computing devices 1090 over a wired or a wireless network. In an illustrative embodiment, the communication connections 1080 include the data interface 110 of FIG. 1 and the data 102 of FIG. 1 is received from other computing devices 1090 such as a shared network storage device.

It will be appreciated that not all of the components or devices illustrated in FIG. 10 or otherwise described in the previous paragraphs are necessary to support embodiments as herein described. For example, the input device(s) 1060 and output device(s) 1070 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable any person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method executing on one or more computing devices, the method causing the one or more computing devices to:
receive a data analysis expression associated with a first column of a first table, wherein the data analysis expression creates a relationship between a second column of a second table from a first data structure and a third column of a third table from a second data structure, wherein the second column and the third column are related from the data analysis expression;
determine the relationship between the second table and the third table using the data analysis expression; and
calculating a value of the data analysis expression associated with a cell in a particular row of the first column using both first data retrieved from the particular row of the second table and second data retrieved from the third table based on a filter context associated with the particular row; and
outputting the calculated value at the cell in the first table.

2. The method of claim 1 wherein the first data structure is an online analytical processing ("OLAP") cube.

3. The method of claim 1, wherein the method further causes the one or more computers to:
receive a selection of a subset of the particular row of the first table; and
automatically re-execute the data analysis expression for the subset of the particular row of the first table.

4. The method of claim 1, wherein the data analysis expression includes a formula.

5. The method of claim 4, wherein the data analysis expression includes a formula associated with at least one aggregation, wherein the at least one aggregation is selected from the group consisting of: a sum pivot table aggregation, an average pivot table aggregation, a minimum pivot table aggregation, a maximum pivot table aggregation, and a count pivot table aggregation.

6. The method of claim 1, wherein the data analysis expression includes at least one time-based function from dateadd, datesbetween, datesinperiod, or parallelperiod.

7. The method of claim 1, wherein the data analysis expression includes a related table function, a relatedtable table function, a filter table function, a distinct table function, a values table function, an all table function, an all except table function, an allnoblankrow table function, or any combination thereof.

8. A computer-readable hardware storage medium storing instructions, that when executed by a computing device, cause the computing device to:
receive a data analysis expression associated with a column of a first table, wherein the data analysis expression creates a relationship between a second column of the first table and a third column of a second table;
determine the relationship between the first table and the second table using the data analysis expression;
calculating a value of the data analysis expression associated with a spreadsheet cell in the first column and in a particular row using both first data in the particular row of the second column and second data retrieved from the third column of the second table, wherein the second column and the third column are related from the data analysis expression, wherein the first data and the second data are selected using a filter context associated with the particular row; and
outputting the value at the spreadsheet cell in the first table.

9. The computer-readable hardware storage medium of claim 8, further storing instructions, that when executed by the processor, cause the processor to:
receive a selection of a subset of rows of the first table; and
automatically re-execute the data analysis expression for the selected subset of rows.

10. The computer-readable hardware storage medium of claim 8, wherein the data analysis expression includes a user-defined formula.

11. The computer-readable hardware storage medium of claim 8, wherein the data analysis expression includes a formula to be aggregated over rows of at least one data table.

12. The computer-readable hardware storage medium of claim 11, wherein the data analysis expression includes at least one aggregation selected from the group consisting of:
a sum pivot table aggregation, an average pivot table aggregation, a minimum pivot table aggregation, a maximum pivot table aggregation, and a count pivot table aggregation, wherein the at least one aggregation may be performed for a plurality of expressions other than the data analysis expression.

13. The computer-readable hardware storage medium of claim 8, wherein the relationship includes a related column that is an index column of the first table, an index column of the second table, or any combination thereof.

14. A method performed by a computing device comprising:
receive a data analysis expression associated with a first cell in a first column of a first table, wherein the data analysis expression references a second column of the first table and a third column of a second table, wherein the first table and the second table are related by the data analysis expression;
determine the relationship between the first table and the second table using the data analysis expression;
calculating a value of the data analysis expression associated with the first cell and in a particular row using both first data in the particular row of the second column and second data retrieved from the third column of the second table, wherein the second column and the third column are related from the data analysis expression, wherein the first data and the second data are selected using a filter context associated with the particular row; and
outputting the value at the first cell in the first table.

15. The method of claim 14, wherein the first table is a multi-dimensional cube data structure.

16. The method of claim 15, wherein the multi-dimensional cube data structure is an online analytical processing ("OLAP") cube data structure.

17. The method of claim 14, wherein the data analysis expression includes a user-defined formula.

18. The method of claim 14, further comprising automatically re-executing the data analysis expression in response to a pivot operation of a pivot table, wherein the first table is a pivot table.

19. The method of claim 14, wherein the reference to the second column resolves to the second column when the reference is used in a column calculation, and wherein the reference to the second column resolves to a value stored at a particular row of the second column when the reference is used in a scalar calculation.

20. The method of claim 14, wherein the data analysis expression includes a formula to be aggregated over rows of at least one data table.

* * * * *